(12) United States Patent
Fear et al.

(10) Patent No.: US 12,349,639 B2
(45) Date of Patent: Jul. 8, 2025

(54) READY TO USE GROW BAGS AND METHODS OF MAKING AND USING THE SAME

(71) Applicants: Douglas Daniel Fear, Winnetka, IL (US); Richard W. North, Chicago, IL (US)

(72) Inventors: Douglas Daniel Fear, Winnetka, IL (US); Richard W. North, Chicago, IL (US)

( * ) Notice: Subject to any disclaimer, the term of this patent is extended or adjusted under 35 U.S.C. 154(b) by 0 days.

(21) Appl. No.: 18/491,963

(22) Filed: Oct. 23, 2023

(65) Prior Publication Data

US 2024/0049650 A1    Feb. 15, 2024

Related U.S. Application Data

(63) Continuation of application No. 17/880,881, filed on Aug. 4, 2022, now Pat. No. 11,793,120.

(60) Provisional application No. 63/229,311, filed on Aug. 4, 2021.

(51) Int. Cl.
*A01G 9/02* (2018.01)
*B65D 33/01* (2006.01)
*B65D 75/00* (2006.01)
*B65D 75/58* (2006.01)

(52) U.S. Cl.
CPC ............ *A01G 9/021* (2013.01); *B65D 33/01* (2013.01); *B65D 75/008* (2013.01); *B65D 75/5805* (2013.01)

(58) Field of Classification Search
CPC .......... A01G 9/021; A01G 9/02; A01G 9/026; A01G 9/029; B65D 31/10; B65D 33/01
See application file for complete search history.

(56) References Cited

U.S. PATENT DOCUMENTS

| | | | | |
|---|---|---|---|---|
| 3,524,279 | A * | 8/1970 | Adams | A01G 9/0295 47/87 |
| 3,739,522 | A * | 6/1973 | Greenbaum | A01G 9/0295 47/87 |
| 3,935,993 | A * | 2/1976 | Doyen | B65D 75/008 383/122 |
| 4,034,508 | A * | 7/1977 | Dedolph | A01G 24/44 521/905 |
| 4,209,945 | A * | 7/1980 | Dent | A01G 24/20 47/84 |
| 5,210,975 | A * | 5/1993 | Beckerman | A01G 9/029 47/84 |
| 5,241,783 | A * | 9/1993 | Krueger | A01G 9/026 47/78 |
| 10,856,676 | B2 * | 12/2020 | Bentzur | A47G 7/06 |
| 11,140,840 | B2 * | 10/2021 | Adelberg | A01H 4/001 |
| 11,793,120 | B2 * | 10/2023 | Fear | B65D 33/01 |
| 2002/0102719 | A1 * | 8/2002 | Adelberg | A01G 9/026 435/297.5 |

(Continued)

*Primary Examiner* — Kristen C Hayes
(74) *Attorney, Agent, or Firm* — Robinson + Cole LLP

(57) ABSTRACT

An elongated bag for use as a ready-to-use grow bag. The bag is manufactured as an elongated plastic body with a sealed bottom and a sealable top. The bag includes one or more gussets defined by folds in the bag and a score line for a tear strip in an area sufficiently below the top and above the fill material to allow the bag to lie flat for transportation and deploy into a cylinder for planting. The bag includes drain holes near the bottom of the bag and microperforations along the bag for respiration.

11 Claims, 15 Drawing Sheets

(56) References Cited

U.S. PATENT DOCUMENTS

| | | | | |
|---|---|---|---|---|
| 2004/0216374 | A1* | 11/2004 | Davids | A01G 31/00 47/59 R |
| 2010/0084425 | A1* | 4/2010 | Bell | B65D 33/24 222/1 |
| 2016/0120133 | A1* | 5/2016 | Adelberg | A01G 24/48 47/65.5 |
| 2020/0130897 | A1* | 4/2020 | Schmoor | B65D 31/10 |
| 2024/0359900 | A1* | 10/2024 | Brulz | B65D 33/01 |

* cited by examiner

READY TO USE GROW BAGS AND METHODS OF MAKING AND USING THE SAME

CROSS-REFERENCE TO RELATED APPLICATIONS

The present application is a continuation of U.S. Non Provisional application Ser. No. 17/880,881, filed Aug. 4, 2022, which claims the benefit under 35 U.S.C. 102(e) to U.S. Provisional Application No. 63/229,311 filed Aug. 4, 2021, the contents of which are hereby incorporated by reference in their entirety.

FIELD OF THE INVENTION

The present invention relates to grow bags for agricultural and horticultural endeavors. More particularly, the present invention relates to grow bags that are designed, manufactured, and shipped ready for use.

BACKGROUND OF THE INVENTION

Grow bags are known in the art. The use of grow bags has become more ubiquitous in cultivating plants in recent years. Grow bags, unlike traditional ground or container plantings, provide a vessel that is customizable, easy to use, and typically disposable. As will be appreciated, using rigid containers presents various challenges when it comes to cost and portability, especially when larger plants or trees are involved. Moreover, for commercial greenhouses, the sheer volume of plantings requires a substantial investment in planting vessels and each vessel must be especially prepared before any seeds or saplings can be planted. In all cases, the preparation and planting tasks are typically very labor intensive processes requiring access to large bags of grow media, fertilizer, and other inputs during the process of filling the grow vessels.

Some prior artisans have turned to the use of grow bags to ease the burden and investment and facilitate cultivation operations. Grow bags are generally either fabric or plastic bags that allow a grow mix, along with seeds or saplings, to be added to the bag. The plants are then cared for and allowed grow to a desired maturity before transplanting or harvesting the plant.

A drawback encountered in the art limiting the use of plastic grow bags relates to the 50-60% moisture content of grow media desirable for plantings. If shipped with moist soil, a nonporous plastic bag prohibits respiration which results in the formation of biofilm and decomposition which leads to problems with later plantings and undesirable odor problems. In addition, a major drawback is that the moisture in the bag may condensate in the bag.

Another prior artisan attempted to make the production and use of plastic grow bags feasible by providing a solid block of grow media with the bag. With these bags, a predetermined grow media is dried and compressed into a block and deposited into the bags before shipment. This is one approach for supplying grow media to the user while avoiding the problem of spillage without the need to seal the bag. However, prior to use, the compressed block must be rehydrated, fluffed to aerate, and then worked for planting by the user. Thus, while the compressed block is shipped dried to prevent several of the well-known drawbacks when attempting to ship loose and moist soil, the end effect that the compressed block must first be rehydrated and fluffed requires the investment of significant time and labor before a planting can be inserted into the formerly compressed media. In addition, as will be appreciated, even when rehydrated, stratification of the formerly compressed grow media can occur, making it challenging to plant into and for rooting to occur, leading to operating difficulties and possibly lower quality or lower yielding plants.

The present inventors have come to recognize many unappreciated, yet long-felt drawbacks in the prior art that limit the utility and ease of use of grow bags. These drawbacks have been unrecognized or acquiesced in by the industry as unavoidable or necessary due to the inability, prohibitive expense, or feasibility of a workable improvement. For example, in addition to the approach of dehydrating grow media described above, the present inventors note that typical bags of grow media, soil and the like are configured in a "pillow" shape having conventional dimensions to provide for palletizing. This conventional pillow shape provides advantages for packaging and shipping but limits palletized bags from serving as effective grow bags.

Moreover, the present inventors recognize that dehydrated and compressed grow media hi its the ability to incorporate biologic materials, such as bacteria or fungi, that are important to planting but benefit from the continual presence of moisture and oxygen, and are harmed by application of high pressure.

The present inventors also recognized that the traditional pillow bags used in the art suffered from many unrecognized or acquiesced drawbacks that resulted in great inefficiency and added expense for end users. For example, the present inventors recognized that most soils companies are focusing on an approach of separately supplying grow media and burdening the user with the filling of rigid containers or grow bags. They don't solve for the physical and logistical difficulties the cultivators face when they need to either move prefilled pots that aren't sealed or prefilled bags that are sealed but need to be opened with a knife or box cutter and then have the sides of the bag rolled down to allow access to the fill level of the media in the grow bag. When installing thousands of bags every week or even daily, this is a laborious, expensive step that the art has come to accept as a necessary evil.

The foregoing underscores some of the problems associated with typical supply methods and containers used in cultivation and the conventional wisdom in the art. Furthermore, the foregoing highlights the long-felt, yet unresolved and unappreciated need in the art for grow bags that can be effectively palletized for shipment yet usable as a freestanding grow bag. The foregoing also highlights the long-felt; yet unresolved and unappreciated need in the art for grow bags that can be shipped with moist and/or loose fill materials that are allowed to respirate during shipment while overcoming the known drawbacks that led the art away from doing so. Finally, the foregoing highlights the unrecognized and unappreciated need in the art for a grow bag sized, shaped, and manufactured that can be filled, sealed, shipped, and deployed as a reliable and affordable ready to use grow bag that greatly reduces the cost and effort of use for the end user.

SUMMARY OF THE INVENTION

Various embodiments of the present invention overcome various of the aforementioned and other disadvantages associated with conventional cultivation containers and grow bags and offer new advantages as well.

The present inventors conceived of multiple different permutations of various of the advantageous aspects, features, and embodiments of the grow bags described and claimed herein. The grow bags represent new, useful, and nonobvious improvements over existing prior art grow bags. The present inventors identified and improved existing grow bags in multiple respects by recognizing a number of problems in the art that were overlooked, unappreciated, or unresolved by prior artisans.

Improvements and discoveries by the present inventors include new and nonobvious bag dimensions to facilitate sealing and shipping, a novel bag opening feature to greatly improve safety, speed, and ease of use, the deployment of novel gusset features to create physical stability, the positioning of effective drainage holes, the use of strategic pin, perforations, or microperforations, and the ability to fill, ship, and supply loose fill material that remains moist and ready for use. Any one or more of these features can be used to improve existing grow bag technology and each should be understood and appreciated by one of ordinary skill as the new, novel, and nonobvious advancement in the art they represent. Superior grow bags include those that make use of most if not all of these improvements. A presently preferred embodiment including most of these specific improvements is described in detail herein in connection with the Detailed Description section below.

According to one aspect of various embodiments of the present invention P there is provided a grow bag having unconventional dimensions. An advantageous feature according to this aspect of the invention is the ability to lay the filled and sealed bag flat akin to a typical pillow bag for palletized shipment, then allowing the bag to have proper dimensions and fill material to provide sufficient volume for service as a grow bag. An additional benefit of added height is in providing room below the bag closure to fit the easy opening tear line.

In a related aspect of various embodiments of the present invention, a score line, or perforations, are provided in an area below the bag seal. An advantageous feature according to this aspect of the invention allows the grow bag to be opened by tearing the bag uniformly along the score line with limited physical effort, thereby assuring an even opening and also dispensing with the need for scissors or box cutters to open the bag. Not only does this reduce or eliminate workers compensation related injuries related to using scissors or box cutters, but there are also significant time savings with tearing open the bag and not having to roll down the plastic sides. This ultimately reduces the workload of preparation by several FTEs and broadens the pool of individuals capable of physically completing the work.

According to another aspect of various embodiments of the present invention there is provided a grow bag having one or more gussets. An advantageous feature according to this aspect of the invention is the ability to lay the bag flat for palletizing and allowing the bag to be deployed and flex the gussets to provide volume and cylindrical expansion for use as a grow bag. An additional benefit of the gussets is the ability to have drain holes created through multiple layers of plastic during manufacturing, and then operatively exposed upon expansion of the gussets during deployment and use.

The provision of these drain holes represents another aspect of various embodiments of the invention. According to this aspect, drainage holes with a specified dimension of approximately ⅜ inch can be provided in the bag. Preferably, these holes are located near the bottom of the grow bag when expanded for use in cooperation with the gussets.

According to another aspect of various embodiments of the present invention, multiple pin holes are mechanically punched or microperforations are laser ablated into the sidewall of the grow bags during manufacturing. According to this aspect, very small breathing holes may be provided without compromising the strength of the bag by known techniques. Breathing holes allow the grow bag embodiments in accordance with this aspect of the invention to be shipped with loose fill or moist material without suffering the drawbacks of sweat, decomposition, or biofilm formation. Additionally, these breathing holes improve plant performance by providing access to air in the root zone.

In accordance with a related aspect of various embodiments of the present invention, the grow bags are not limited to shipment with dehydrated, compressed grow media. Unlike prior art grow bags containing dried and compressed material that had to be rehydrated and fluffed for use, an advantageous feature is the ability to provide ready-to-use grow bags, According to this aspect, the grow bags may be provided with any combination of components including combinations using a major component such as compost or shredded bark, a minor component such as bone meal or bat guano, inputs to improve porosity and reduce undesirable compaction, microbes that make nutrients available to plants, and/or supplemental other nutrients such as calcium, magnesium, phosphorous, or iron. As will be appreciated, the ability to provide any custom blend of ready-to-use grow media that allows the user to plant without the difficulty encountered when using prior art grow bags presents a significant advancement to the art.

Other advantageous features of various aspects of the present inventions will be readily appreciated by one of ordinary skill in the art armed with the present specification. The inventions as described and claimed herein should become evident to a person of ordinary skill in the art given the following enabling description and drawings. The aspects and features believed to be novel and other elements characteristic of the inventions may be set forth with particularity in the appended claims. The drawings are for illustration purposes only and are not drawn to scale unless otherwise indicated. The drawings are not intended to limit the scope of the invention. The following enabling disclosure is directed to one of ordinary skill in the art and presupposes that those aspects of the invention within the ability of the ordinarily skilled artisan are understood and appreciated.

BRIEF DESCRIPTION OF THE DRAWINGS

Various aspects and advantageous features of the present invention will become more apparent to those of ordinary skill when described in the detailed description of a preferred embodiment and reference to the accompany drawing wherein.

DETAILED DESCRIPTION OF PREFERRED EMBODIMENT

Figure 1:
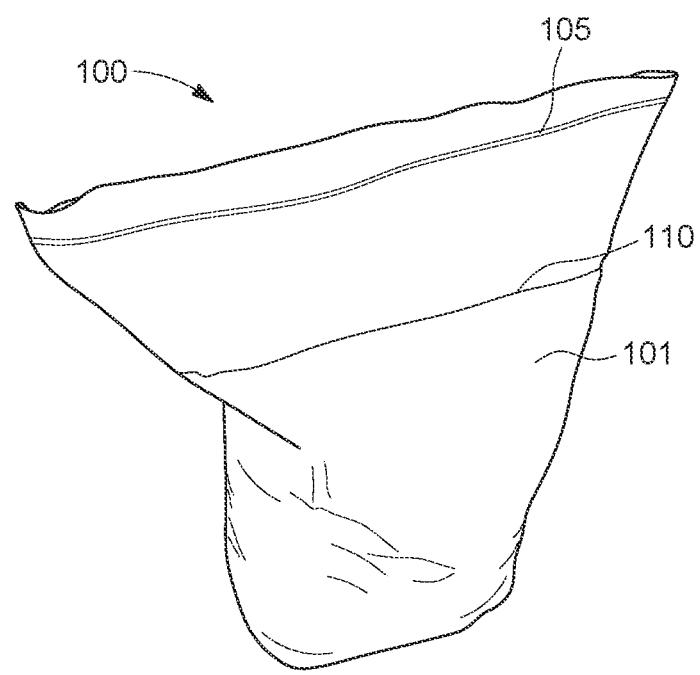
FIG. 1 is an elevated perspective view of a ready-to-use grow bag in the closed position.

Presently preferred embodiments of a ready-to-use (RTU) grow bag incorporating various novel and nonobvious improvements over the prior art are depicted in FIGS. 1-15. As represented, the grow bag 100 is preferably made of a plastic material for ease and inexpense of manufacturing, and flexibility for palletization and shipping. However, any suitable material may be used. The grow bag 100 includes a continuous sidewall 101 defining a fillable cavity 102 with a closed bottom 103 and open top 104 that may be sealed after filling via any known means such as heat sealing 105 as shown in the depicted embodiment. Below the heat seal 105 the bag includes a score line 110 that is used as a tear strip to open the bag.

The tear strip 110 is a unique feature providing many benefits to the end user. The tear strip allows efficient filling, packing, unpacking and installation of the grow bags. Most soil companies are focusing on an approach of separately supplying grow media, and burdening the user with the filling of rigid containers or grow bags. They don't solve for the physical and logistical difficulties the cultivators face when they need to either move prefilled pots that aren't sealed or prefilled bags that are sealed but need to be opened with a knife or box cutter and then have the sides of the bag rolled down to allow access to the fill level of the media in the grow bag. When installing thousands of bags every week or even daily, this is a laborious, expensive step that has not been solved for. The cost savings related to the installation and ready to plant media are significant and transformational for companies wanting to focus on cultivation and not soil management. The tensile strength of the tear strip is very important to allow ease of opening during installation while preventing rupturing during shipping and placement. The tensile strength and amount and size of perforations on the score line depend on the size and contents of the bag, and the suitability of any score line for a bag is well within the ability of one of ordinary skill in the art through routine experimentation. As will be appreciated, by shipping a loose fill material of specified volume for individual plants, the weight of the grow bags is much less than that of prior art soil or fertilizer bags.

The bag 100 preferably defines one or more gussets 120 that may lay flatter for shipping and deployable at the time of planting. The gussets 120 may be configured similar to the gussets found on brown paper grocery bags and the like that allow for expansion of the interior volume when deployed. As will be appreciated, the gussets allow the bag to be manufactured and shipped in a rectangular or "pillow" form that is deployable as a cylinder for use when planting.

The grow bags are designed to be longer than prior art pillow bags to allow space for sealing the top, and capacity for grow media to lay relatively flat for palletization and ease of transportation. The increased length provides several advantages over typical prior art pillow bags while maintaining the importance of allowing the product to lay flat for palletization for shipping. First, the increased length accommodates the fill material needed due to the lateral expansion of the bag when set upright for use. In addition, the extra length provides adequate room below the heat seal 105 for the score line 110 of perforations to facilitate a smooth and tool free opening of the bag at a predetermined height that ensures a sufficient lip 111 of void space at the top of the bag at the time of planting. Preferably, the score line facilitates opening without presenting the risk of inadvertent tearing when the bag is carried by the top.

The fill levels of the media, while flexible based on the chosen bag design, are supported by the placement of the tear strips, enabling a range of grow media volume to be placed in a single bag dimension. Moreover, the dimensions of the bags are designed to foster significant root growth and development leading to more resilient, higher quality and higher yielding crops.

The bags can be configured in shapes and manufactured of materials that are chosen or desired for specific uses and features. For example, as for materials of construction, the grow bags may be made of a biodegradable material if desired. As for manufacturing, the bags can be configured with bottom, side, or some combination of gussets to achieve a desired expandable size and shape. In other embodiments, the bag can include a second tear strip near or at the bottom of the bag which provides additional benefits.

Figures 3A, 3B:
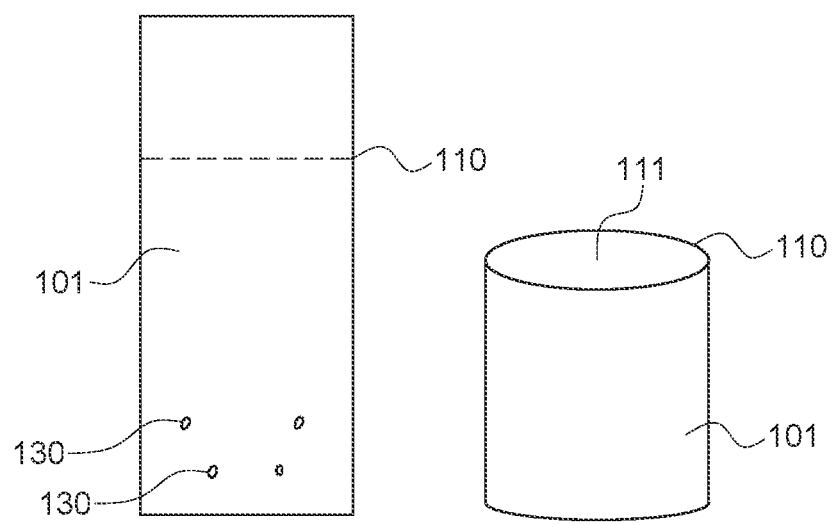
FIG. 3A is a side view of an embodiment of a 3-gallon ready-to-use grow bag prior to fill.
FIG. 3B is a side perspective view of the ready-to-use grow bag of FIG. 3A after opening and ready for planting.
Figure 8:
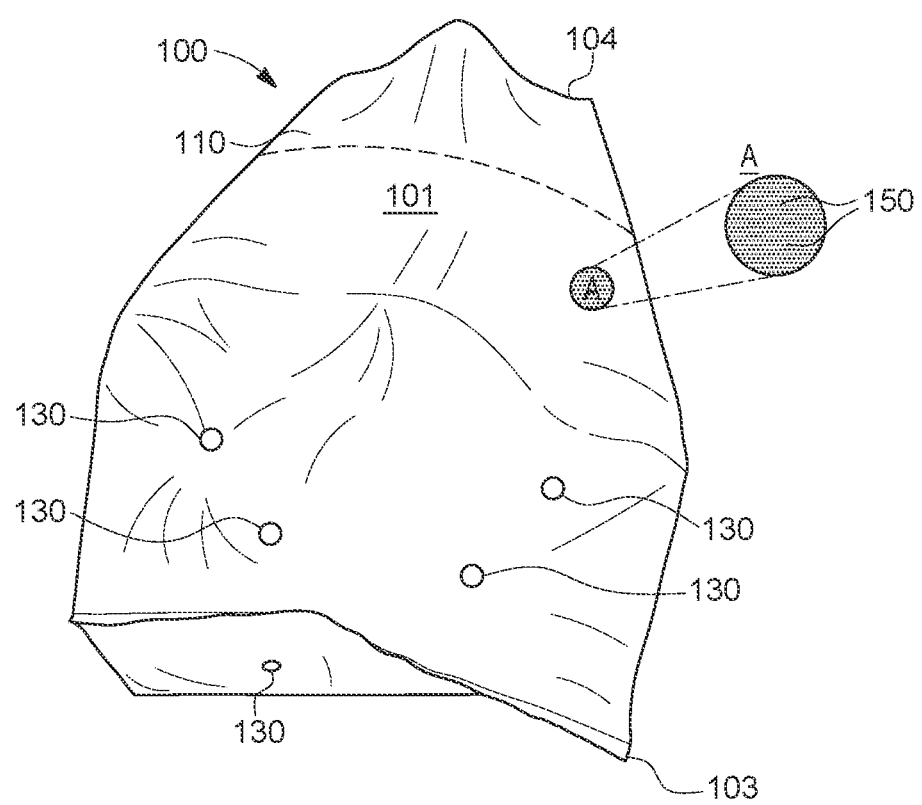
FIG. 8 is a bottom perspective view of the embodiment of a ready-to-use grow bag of FIG. 6 showing the exposed drainage holes.
Figure 9:
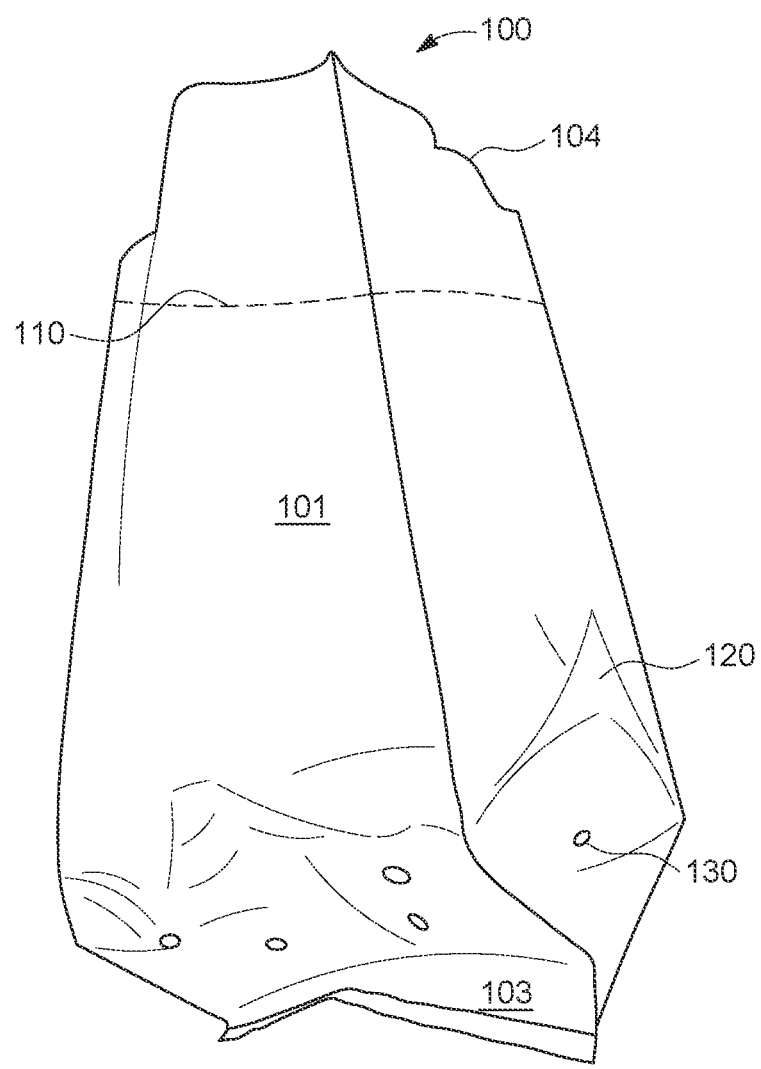
FIG. 9 is a side elevated perspective view of the embodiment of a ready-to-use grow bag of FIG. 6 showing the exposed drainage holes.
Figure 10:
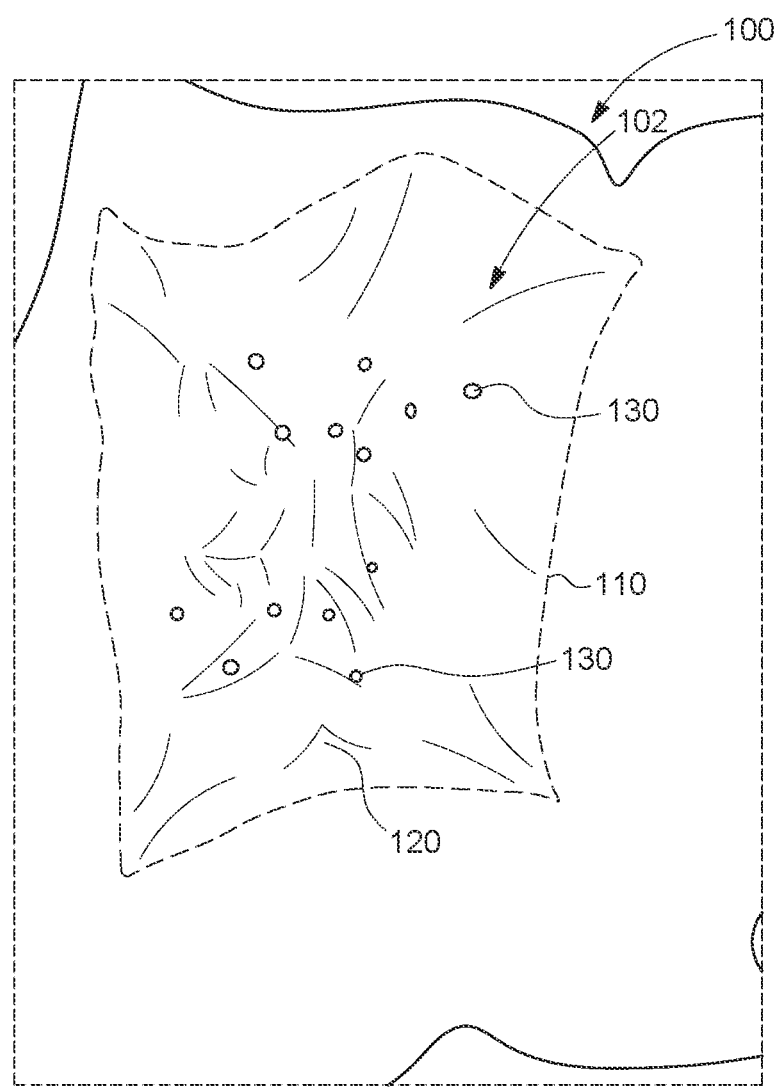
FIG. 10 is a top view of the interior of an embodiment of a ready-to-use grow bag after deployment of the gussets and bottom drain holes.

In a presently preferred embodiment for a 3-gallon grow bag shown in FIGS. 3A and 3B, the bag is manufactured to be 21 inches in length and 9 inches across with side gussets 120 in the range of 7.25 inches. Preferably, the score line 110 is cut 6 inches below the top of the bag. The 6 inches leaves enough room for the heat seal 105 and the void space lip 111. Also, the bag preferably includes drain holes 130 strategically punched in the bottom 5 inches of the bag. With this configuration, when deployed for planting by standing the bag upright, the bag expands due to the lateral force of its contents into a cylindrical form about 10.345 inches in diameter and a height of approximately 10 inches. The expansion preferably flexes the drain holes 130 via the gussets 120 to the bottom 102 of the grow bag 100 as best shown in FIGS. 8-10. After a simple removal of the tear strip 110 the bag is ready for planting.

Figure 4A:
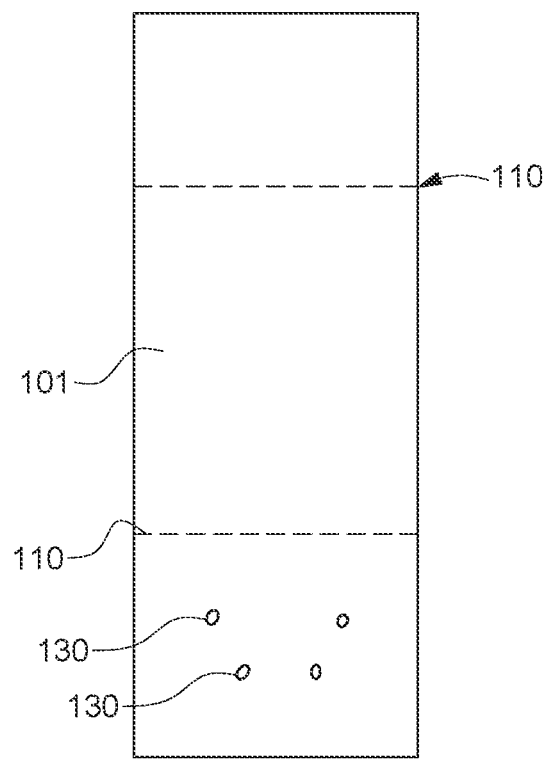
FIG. 4A is a side view of an embodiment of a 10-gallon ready-to-use grow bag prior to fill.
Figure 4B:
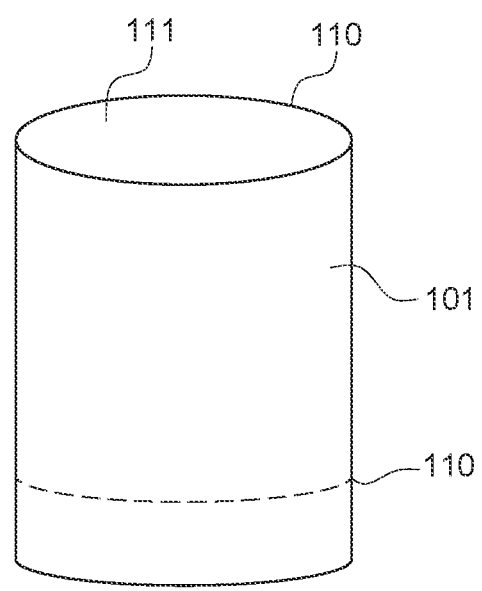
FIG. 4B is a side perspective view of the ready-to-use grow bag of FIG. 4A after opening and ready for planting.
Figure 5:
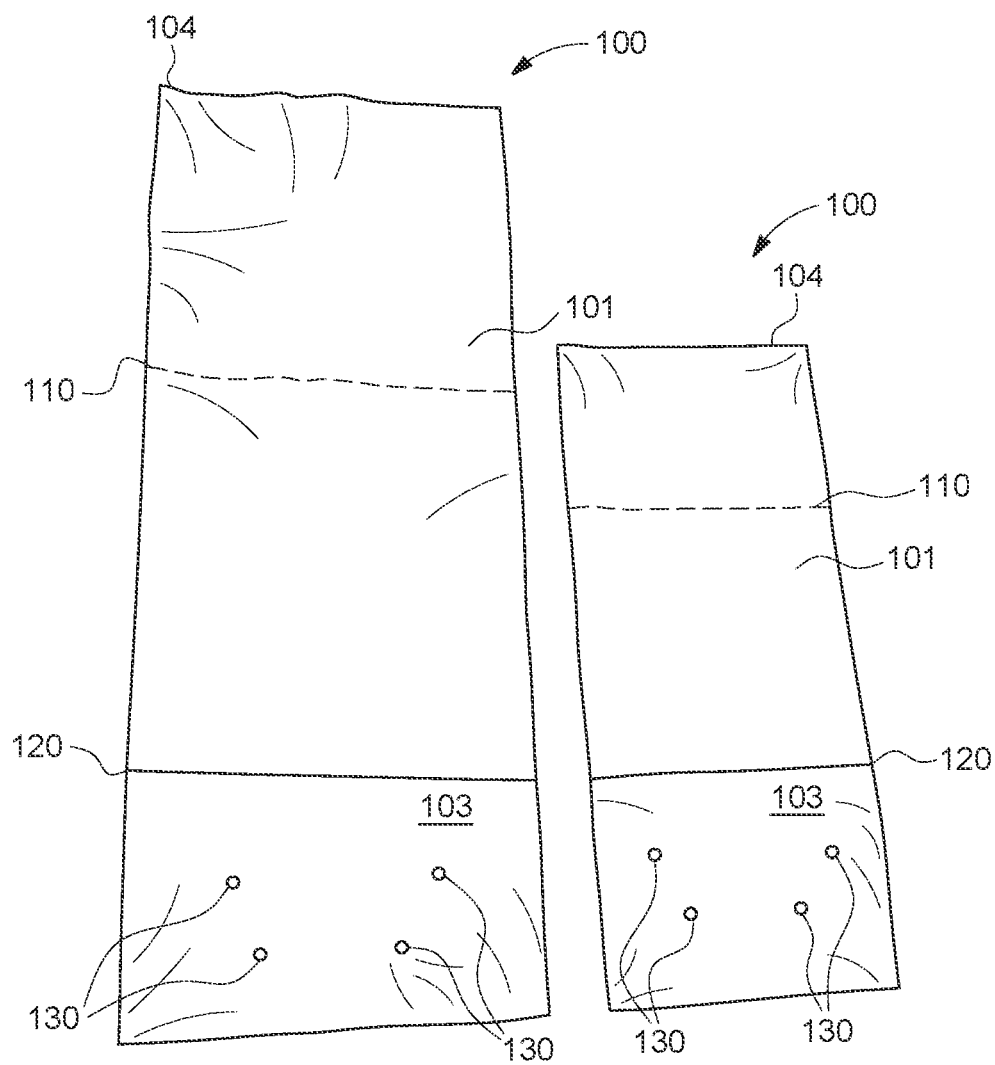
FIG. 5 is a side view of embodiments of an empty 3-gallon and empty 10-gallon ready-to-use grow bag in the empty and flat condition.
Figure 6:
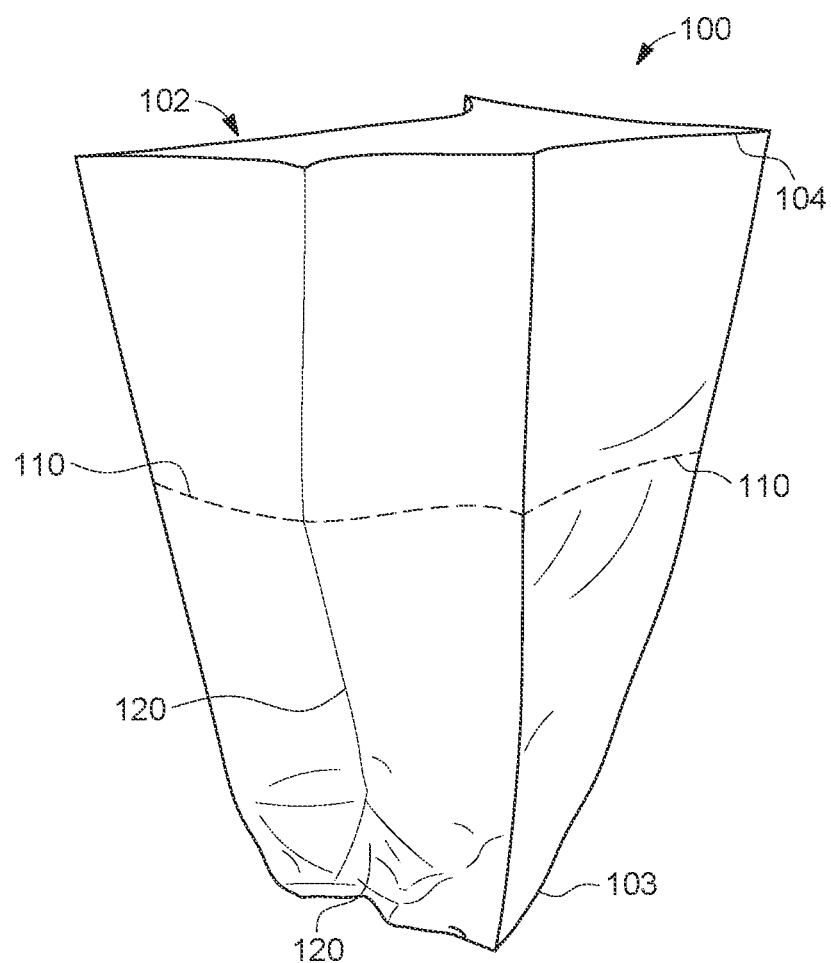
FIG. 6 is a side perspective view of an embodiment of a ready-to-use grow bag with the gussets partially deployed.
Figure 7:
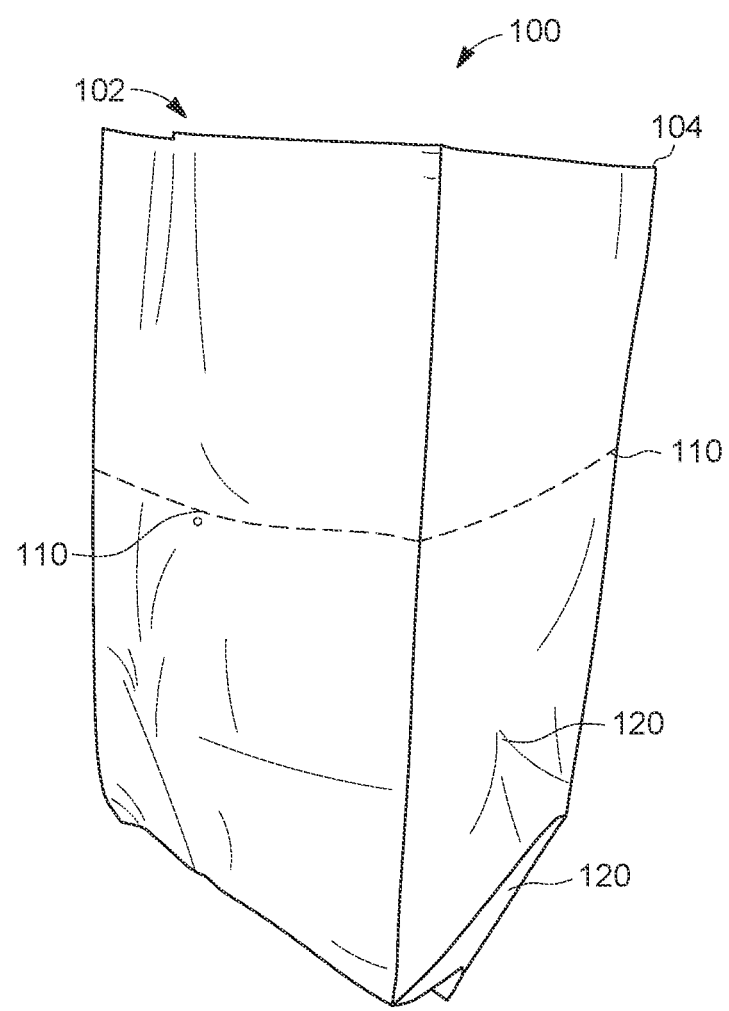
FIG. 7 is a side view of the embodiment of a ready-to-use grow bag of FIG. 6 with the gussets more fully deployed.

In a presently preferred embodiment for a 10-gallon grow bag as shown in FIGS. 4A and 4B, the bag is manufactured 21 inches long and 12 inches wide with the drain holes 130 in the bottom 7 inches of the sides 101 and the tear strip 110 being scored about 7 inches below the top 103 of the bag. When set up properly, the bag flexes to 14 inches in diameter and has a height of about 17 inches. As will be appreciated, any suitable dimensions for grow bags and suitable configurations for gussets are deemed within the scope of the invention. The determination of the suitability of any material, specific dimensions, or configurations is well within the ability of one or ordinary skill in the art armed with the present specification through routine experimentation.

As will be appreciated by one of ordinary skill, it is not essential that the drain holes 130 be blocked during transportation by the undeployed gussets. The drain holes 130 are strategically sized to hold material in place without compromising the utility of the holes in operation. Typically, loose fill materials will sufficiently bridge together or have a nesting effect that creates a barrier to material exiting the hole while allowing air and water to move more freely. In any event, for ease of manufacturing, some configurations of using drain holes may rely on bridges or nesting and ship the grow bags with accessible drain holes.

The provision of gussets 120 is particularly advantageous with plastic grow bags. Flexible plastic rounds out to a cylinder due to the expansion of the bag by the lateral force of its contents. As a cubic bag works to round itself, the circumference increases 27%. Use of gussets 120 allows the bags to be manufactured, stored, and shipped in flat pillow form on pallets greatly decreasing shipping and storage costs. The gussets 120 allow a rectangular pillow bag to round out with a flatter and more stable bottom.

Although not normally visible, the bag preferably includes pin holes, laser ablated microperforations, or similarly formed tiny openings 150. These small openings serve as breathing holes for the contents of the grow bags. Prior art grow bags included dehydrated and condensed materials to remove all moisture from the contents of the bags prior to rehydration and use. The sweating, rot, and algae problems associated with moisture in plastic bags is a well known phenomena and steers the art away from the transport of moist and loose materials. However, as will be appreciated, the present inventors went against the great weight of authority in the art and configured bags suitable for shipping with moist grow media.

To this end, the openings 150 are sized, positioned, and of a number chosen to not compromise the strength of the bag while providing sufficient respiration for the grow media in the bag. Typical grow media or potting soils are between 50-60% moisture. As will be appreciated, normally if shipped in this condition, the sealed bag gets droplets of moisture that may be reabsorbed but causes the bag to sweat and develop biofilm and algae on shipping pallets. The provision of tiny openings 150 allow the water vapor to respirate so it does not condensate in the bag or on the pallet. Further, by providing respiration to the bag, grow media that includes materials such as fungi or bacteria may be added to the bags and survive shipping and storage. In addition, once the bags are deployed, the openings 150 continue to provide plant roots additional transpiration on a level which was typically achievable with woven fabric grow bags and the like.

Figure 2:
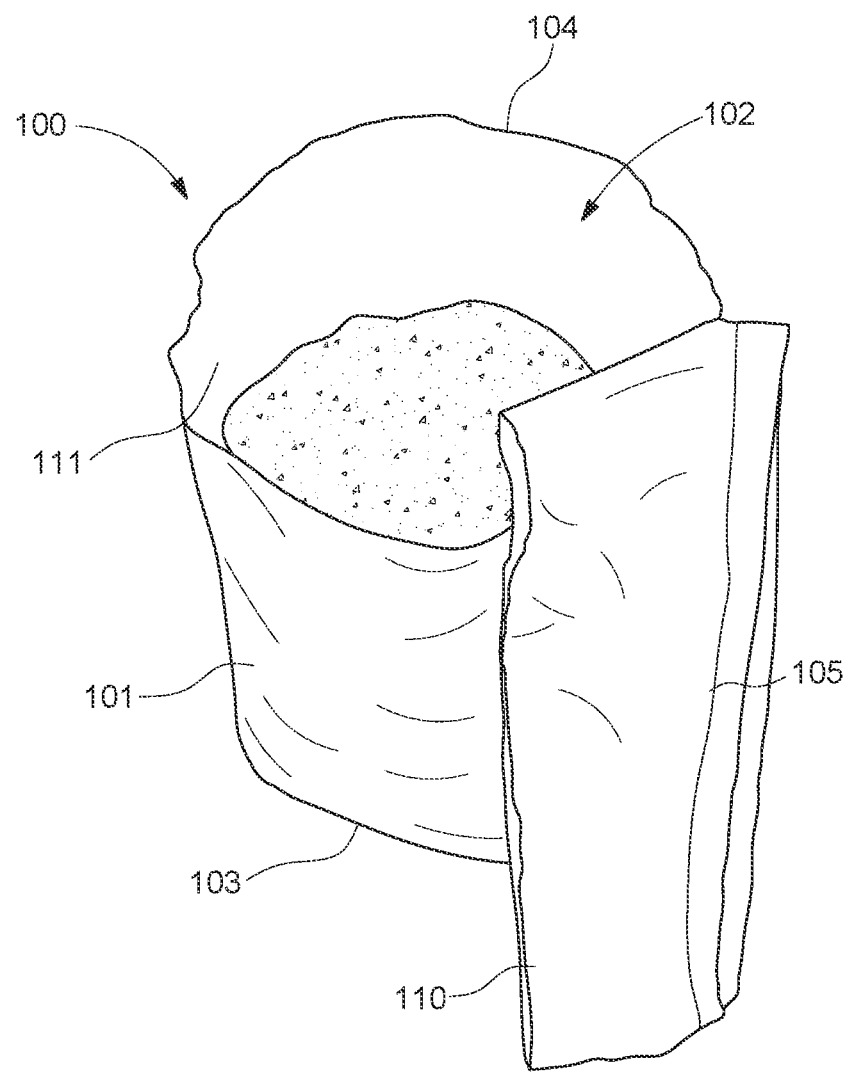
FIG. 2 is an elevated perspective view of a ready-to-use grow bag in the open position.

The grow media 200 options for bag fill are nearly limitless with bags including various of the advantageous features of grow bags described above. The ability to manufacture, store, ship, and have ready for use grow bags with moist and/or loose fill material represents a paradigm shift in the art of grow bags. In a presently preferred embodiment as best shown in FIG. 2, the grow media 200 comprises a loose fill material having a major component such as coca coir, compost, peat moss, shredded bark, or the like. The grow media 200 may also include a minor material like bone meal, bat guano, kelp, or the like, Inputs, such as perlite or pumice, may be added to improve porosity and reduce undesirable compaction. The grow media may also include microbes that are active, such as fungi or bacteria, that make nutrients available to plants, as well as other added nutrients like calcium, magnesium, phosphorus, or iron. As will be appreciated, providing loose fill materials with predetermined constituent materials that maintain proper moisture and oxygen content throughout the manufacturing, shipping, and storage phases results in a grow bag ready for use without the drawbacks of prior art grow bags.

Figure 11:
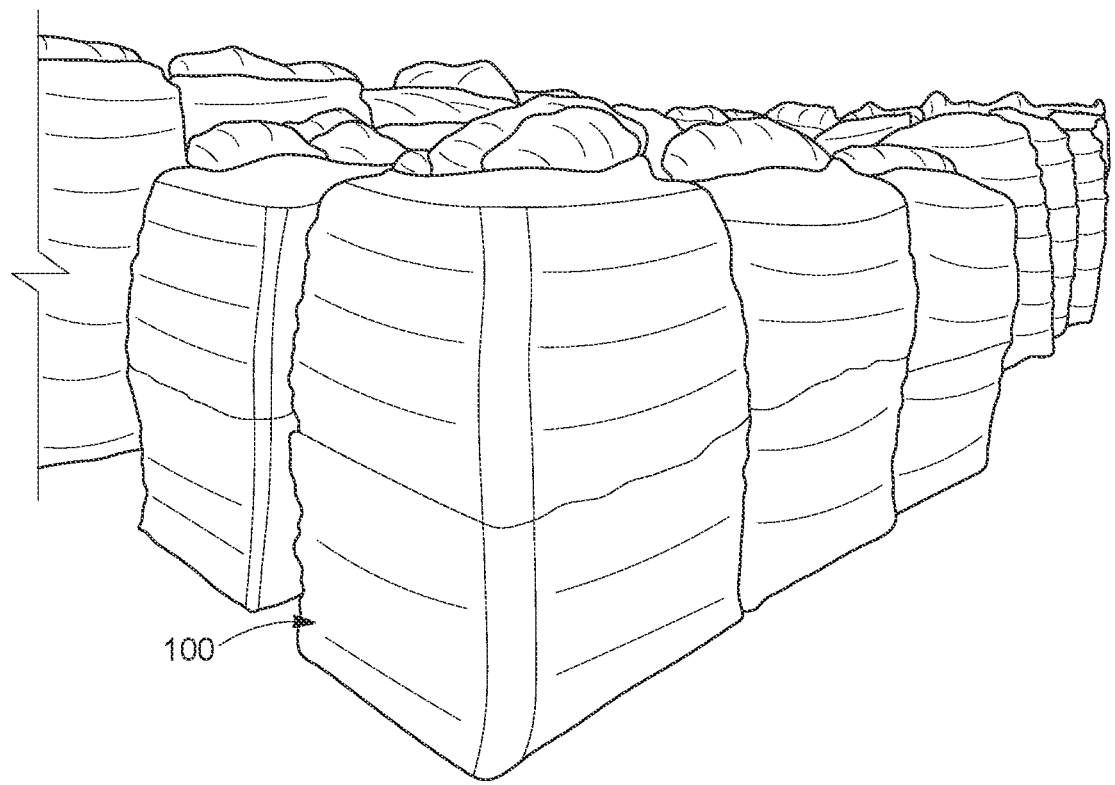
FIG. 11 is an environment view of a pallet of ready-to-use grow bags according to a preferred embodiment.

In operation, a grow bag substrate is formed of a plastic material into a rectangular tube with one or more gusset bends folded in and an open top. The bag substrate is treated to include drain holes in a lower area and pin holes around the bag body. A score line for opening the bag is punched along an upper end of the bag below the open end. The bag opening is accessed, and a loose fill material of a predetermined formulation and predetermined amount is deposited in the bag. The top of the bag is heat sealed closed and the bag laid flat and palletized for shipping as shown in FIG. 11.

Figure 12:
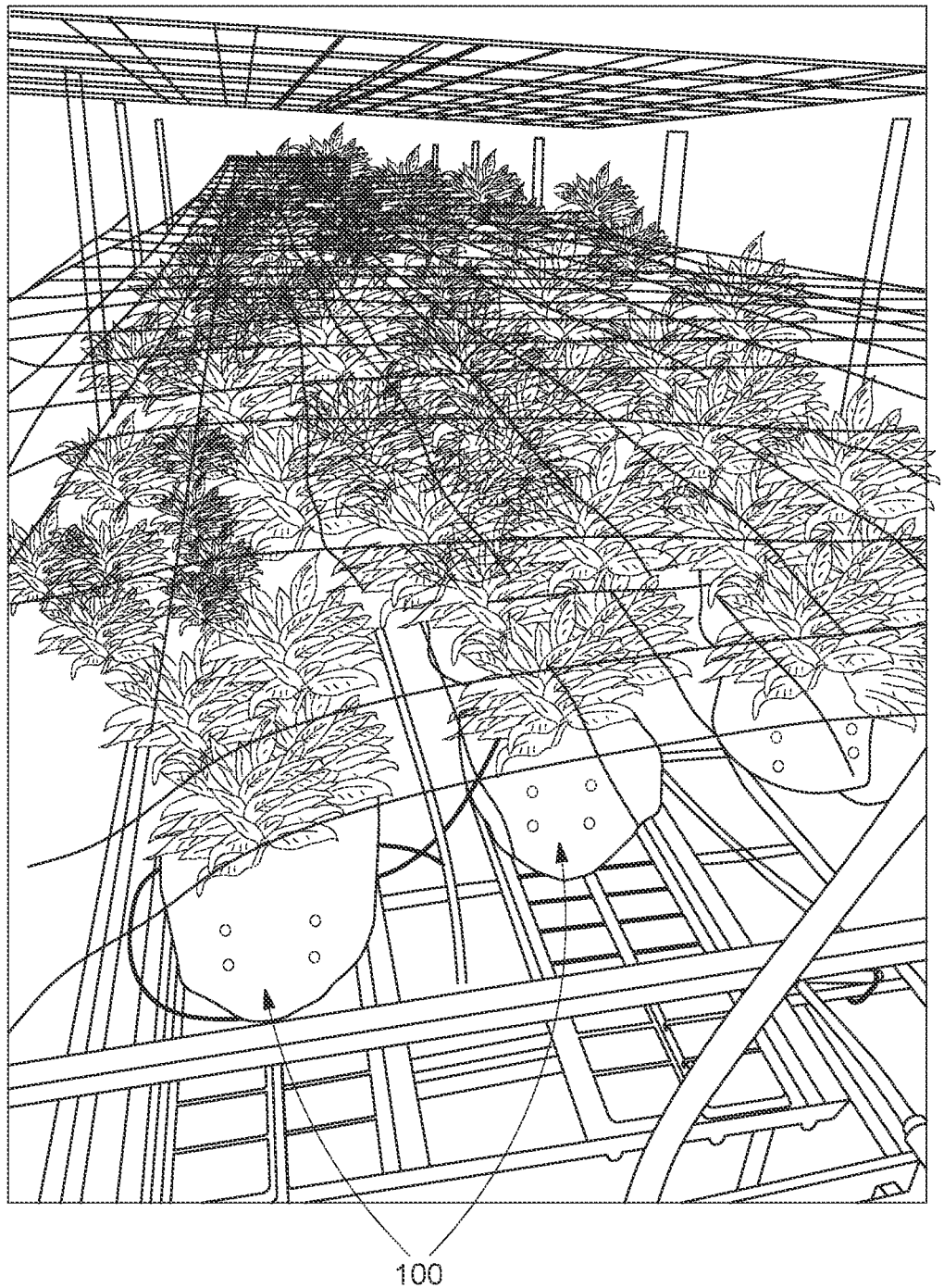
FIG. 12 is an environment view of a greenhouse using ready-to-use grow bags with an orchard of plant saplings according to a preferred embodiment.

A user places the bag upright when ready for use. The bag is positioned upright and easily manipulated to round the bag into a stable setting. The bag is opened by puffing the top end of the bag laterally and tearing the bag open along the score line. A planting or seeds are then deposited into a desired position and depth in the grow media. Any irrigation equipment or the like is inserted, and the bag is ready for watering and cultivation. The bag remains free standing and the plant is allowed to grow in place until it reaches a desired maturity for harvesting or transplanting as shown in FIG. 12.

Figure 13:
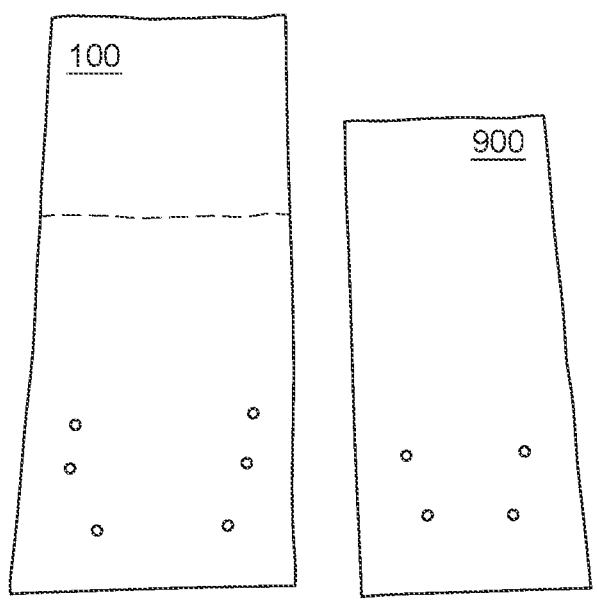
FIG. 13 is a side-by-side comparison a 3-4 gallon prior art over-the-counter (OTC) grow bag and a similar volumed embodiment of a ready-to-use grow bag in an unfilled and undeployed state to visually demonstrate some of the physical improvements over prior art grow bags.
Figure 14:
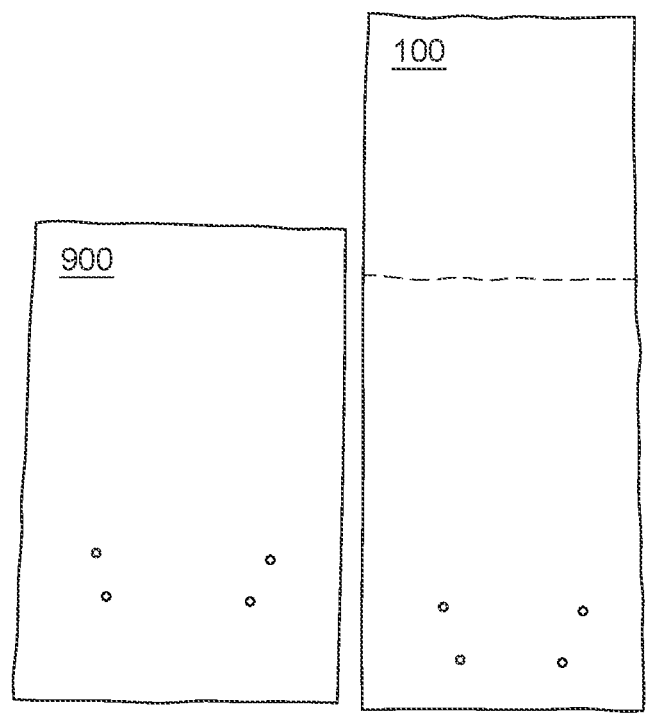
FIG. 14 is a side-by-side comparison a 10-12 gallon prior art over-the-counter (OTC) grow bag and a similar volumed embodiment of a ready-to-use grow bag in an unfilled and undeployed state to visually demonstrate some of the physical improvements over prior art grow bags.
Figure 15:
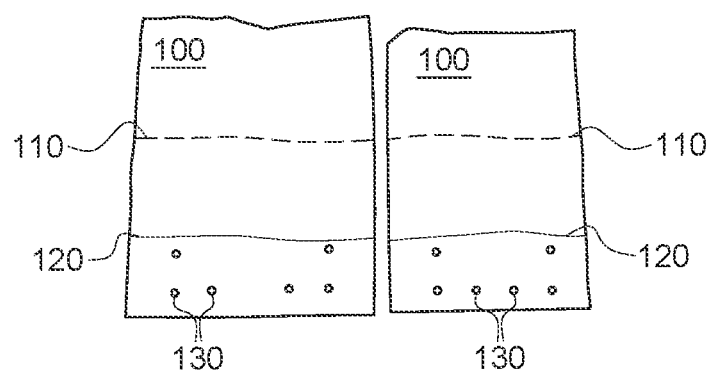
FIG. 15 is a top view of 1.5-2 gallon and 4-5 quart ready-to-use grow bag in an unfilled and undeployed state to visually show drainage holes and a bottom gusset as described in the original disclosure.

FIGS. 13-15 are included to provide additional visual clarity on various aspects and improvements over the prior art achieved by various embodiments of the invention described above. FIG. 13 shows a side-by-side comparison of a prior art over-the-counter (OTC) 3-4 gallon grow bag and an embodiment of a 3-4 gallon ready-to-use (RTU) grow bag of the present invention in the unfilled and undeployed state. As shown, the OTC bag 900 on the right is shorter than the RTU grow bag 100 on the left. As described above, the longer bag allows for a tear strip 110 to be deployed well below the heat seal 105 closing the top of the bag. The void space lip 111 allows the filled bag to be shipped as a pillow and then opened and deployed as a standing cylinder. The OTC bag cannot be similarly shipped and deployed, and typically requires a cutting tool to open.

FIG. 14 shows a side-by-side comparison of a prior art over-the-counter (OTC) 10 gallon grow bag and an embodiment of a 10-12 gallon ready-to-use (RTU) grow bag of the present invention in the unfilled and undeployed state. As clearly discernable, the OTC bag 900 on the left is much shorter than the RTU grow bag 100 on the right. As previously described, the longer bag is unconventional in the art, but provides many of the advantageous features of the present invention when it comes to shipping, storage, and use.

FIG. 15 depicts a pair of differently sized ready-to-use grow bags 100 using a bottom gusset 128 to provide visually clarity of alternate embodiments not using side gussets.

In accordance with presently preferred embodiments, the ready-to-use grow bags provide benefits to the end user never previously achievable or deemed possible by the contemporary state of prior art grow bags. The ready-to-use grow bags of these various embodiments allow end users to enhance and optimize current cultivation practices in ways never imagined. The grow bags are adapted to be customizable and uniform in many respects. An end user can specify a volume and blend of mix for particular grow uses. For example, smaller bags with a specific blend for small plants can be ordered in a desired quantity. Bags with that volume, in that size, and with that blend of grow media will be received and can be put where desired and ready for planting by the simple pull along the tear line. For growers looking to plant hundreds of seedlings needing a specific potting mix and specific container volume no longer have to prepare and blend materials on site. The labor savings and removal of potting mix blending errors is enormous and believed by the present inventors to present a significant advancement in the art.

As will be appreciated, ready-to-use grow bags incorporating some or all of the advantageous features described above save time and effort compared to contemporary grow bags and provide benefits and efficiencies in manufacturing, transportation, and use never before believed feasible or possible with grow bags.

The above embodiments are for illustrative purposes and are not intended to limit the scope of the invention or the adaptation of the features described herein to particular use, field, or environment. Those skilled in the art will also appreciate that various adaptations and modifications of the above-described preferred embodiments can be configured without departing from the scope and spirit of the invention. Therefore, it is to be understood that, within the scope of the appended claims, the invention may be practiced other than as specifically described.

What is claimed is:

1. A method of distributing an elongated body for use as a ready-to-use grow bag comprising the steps of:
   manufacturing an elongated body having a side wall defining a tubular body with a closed bottom and sealable top end with one or more gussets defined by folds in said side wall and a score line defining a tear strip in an area below said sealable top end;
   adding drain holes to said elongated body during manufacturing of said elongated bag;
   partially filling said elongated body with a predetermined amount of grow material of a volume that allows the elongated body to lie flat in a generally rectangular shape for shipping;
   sealing said sealable top end of said elongated body;
   palletizing said elongated body for shipment to an intended destination; and
   introducing said palletized elongated body into the stream of commerce.

2. The method of claim 1, wherein said elongated body is manufactured to have a length of approximately 21 inches, a width of approximately 9 inches, and said score line approximately 6 inches from the top of said elongated body.

3. The method of claim 2, wherein said elongated body is manufactured to have said side gussets of approximately 7.25 inches.

4. The method of claim 1, further comprising the steps of:
   purchasing said elongated body in said stream of commerce; and
   deploying said elongated body as a grow bag.

5. The method of claim 4, wherein after deployment said elongated body has a height of approximately 10 inches and a diameter of more than 10 inches.

6. The method of claim 5, wherein after deployment said drain holes are positioned at the bottom of said elongated body.

7. The method of claim 6, wherein after deployment said drain holes are positioned on the side of said elongated body.

8. The method of claim 1, wherein said deploying said elongated body comprises the steps of:
   removing the tear strip from said elongated body to allow access to the grow material;
   standing said elongated body up on said closed bottom;
   deploying said gussets;
   adding any desired seeds, seedlings, saplings, or water to said grow material; and
   allowing said elongated body to expand into the shape of a free-standing cylinder.

9. The method of claim 1, wherein said grow material is a loose fill or moist material that does not require any rehydration or fluffing before use.

10. A method of planting a plurality of seedlings for a cultivation process comprising:
    ordering a plurality of ready-to-use grow bags, each grow bag having an elongated body having a side wall defining a tubular body with a closed bottom and sealable end, said side wall including at least one gusset that allows a filled grow bag to lie flat for shipping in generally rectangular form, a tear strip defined below said sealable end that allows a filled grow bag to be opened without tools, and a plurality of breathing holes in said side wall formed during manufacturing of said grow bags;
    ordering a fill material to be deposited into each grow bag prior to shipping, said fill material including a loose fill or moist material that does not require rehydration or fluffing prior to use and being of a volume to allow said grow bags to lie flat for shipping in a generally rectangular form; wherein said grow bags are filled with said fill material and said bags are sealed for shipping;
    receiving a shipped pallet of filled grow bags in a palletized arrangement;
    arranging said plurality of grow bags in a predetermined area said cultivation process;
    tearing the tear strip off each grow bag and planting a seedling in said fill material;
    allowing each grow bag to operate as a free-standing cylindrical plant container.

11. A grow bag comprising:
    an elongated body having a side wall defining a tubular body with a closed bottom and sealable end, said side wall including one or more gussets;
    said one or more gussets configured to lay flat for shipping and deploy at planting; said gussets allowing the bag to be manufactured and shipped in a rectangular form that is deployable as a cylinder for use when planting; said bag configured elongated to allow sealing said top after filling with grow media and allowing said bag to lay relatively flat for palletization;
    said sealable end comprising a heat sealable closure;
    a tear strip defined by a score line below said sealable end;
    a plurality of breathing holes in said side wall;
    a plurality of drainage holes is said side wall;
    a fill material deposited in said tubular body before sealing said heat sealable closure of said sealable end; wherein said grow bag lies flat for shipping and expands via activation of said gussets into a self-standing cylinder; and wherein said breathing holes and said drainage holes are formed in said side wall prior to filling said body.

\* \* \* \* \*